United States Patent [19]

Daroga et al.

[11] 4,286,013
[45] Aug. 25, 1981

[54] FLAME BARRIER

[75] Inventors: Minoo J. Daroga, Woodbury; Robert E. Jones, Minneapolis, both of Minn.

[73] Assignee: Minnesota Mining & Manufacturing Company, St. Paul, Minn.

[21] Appl. No.: 182,685

[22] Filed: Aug. 29, 1980

[51] Int. Cl.³ ............................................. B32B 7/00
[52] U.S. Cl. .................................. 428/266; 428/268; 428/333; 428/339; 428/340; 428/367; 428/402; 428/406; 428/447; 428/921
[58] Field of Search ............... 428/266, 268, 325, 333, 428/339, 340, 367, 402, 406, 921, 447; 252/8.1

[56] References Cited

U.S. PATENT DOCUMENTS

| | | | |
|---|---|---|---|
| 2,643,964 | 6/1953 | Johannaen | 428/266 |
| 2,684,349 | 7/1954 | Whelton | 428/266 |
| 4,152,481 | 5/1979 | Swihart | 428/266 |

Primary Examiner—James J. Bell
Attorney, Agent, or Firm—Cruzan Alexander; Donald M. Sell; James V. Lilly

[57] ABSTRACT

This invention relates to devices for preventing the spread of flame (i.e., flame barriers).

The invention comprises a sheet having a backing bearing a coating of 50 to 70 weight % diorganopolysiloxane gum, 1 to 10 weight % fibrous filler, 20 to 45 weight % hollow glass microspheres, and 1 to 5 parts by weight curing agent per 100 parts by weight of said gum. The sheet (i) is substantially free from components volatilizing below 350°C., and (ii) has a weight of at most 0.6 g/cm². Preferably the coating is applied in a multilayer fashion.

The present invention is a light-weight, non-intumescing sheet useful as a flame barrier between fuel tanks or engines and passenger or cargo compartments of mass transportation vehicles.

11 Claims, 3 Drawing Figures

FLAME BARRIER

FIELD OF THE INVENTION

This invention is related to devices useful in preventing or retarding the advance or spread of flame. Such devices are sometimes referred to hereinafter as flame barriers.

BACKGROUND ART

Materials to prevent or retard the advance of flame are useful, particularly where it is desired to provide additional escape time for persons trapped in confined spaces by fire. An especially critical field of use for such materials is in vehicles used for mass transportation (e.g., airplanes, busses, trains) where relatively large numbers of people are confined within a relatively small space.

Numerous materials are known for preventing or retarding the advance of flame. For example, flexible sheet materials that employ intumescent materials are disclosed in U.S. Pat. No. 3,916,057 and British Pat. No. 1,513,808. Sheet materials that incorporate exfoliated or "popped" mica are disclosed in U.S. Pat. No. 3,001,571. Sheet materials that incorporate vermiculite are disclosed in U.S. Pat. Nos. 2,204,581 and 3,434,917.

Endothermal sheet materials are described in U.S. Pat. No. 3,144,840. These materials comprise a metal film adhesively bonded to a flexible backing. An endothermal layer is bonded to the side of the flexible backing opposite the metal film. The endothermal layer comprises an organic binder and an endothermic filler.

The foregoing sheet materials all suffer from at least one serious disadvantage, that is, they are relatively dense or "heavy". Consequently, they are not suited for use in the transportation field where added weight can significantly reduce fuel efficiency.

The present invention overcomes this drawback by providing a light weight sheet material that possesses excellent flame barrier properties. The flame barrier properties of the invention are demonstrated by its ability to retain sufficient structural integrity to prevent the flame from breaking through it for at least 30 minutes even though it may be charred by the flame. It has been found that this can be achieved without the use of either an intumescent material or a flame retardant. Details of the test utilized to test the flame barrier characteristics of the sheet are described more fully hereinafter.

The weight and flame barrier properties of the sheets render them useful in a variety of applications. For example, the sheet is useful in airplane escape slides, engine housings and pylons, cargo compartments, and fuselages.

Additionally, it has been found that the sheet of the invention possesses good low frequency noise absorption characteristics thereby rendering it useful as an acoustic barrier. This is surprising since the sheet is light weight and because it is usually necessary to utilize much heavier materials to achieve similar acoustic damping.

DISCLOSURE OF THE INVENTION

In accordance with the present invention there is provided a sheet useful as a flame barrier comprising a backing having thereon a coating comprising from 50 to 70% by weight of a cured diorganopolysiloxane gum, from 1 to 10% by weight of a fibrous filler, from 20 to 45% by weight of hollow glass microspheres, and from 1 to 5 parts by weight of a curing agent per 100 parts by weight of said diorganopolysiloxane gum, wherein said sheet is substantially free from components which volatilize at below 350° C., and wherein said sheet has a weight of at most 0.06 g/cm$^2$.

The substantial freedom from components which volatilize at below 350° C. enables the sheets of the invention to be free from flash-through. This phenomena occurs when a brief burst of flame appears on the side of the fabric away from the flame source (i.e., the opposite side of the sheet). While it may last for only a fraction of a second, and while the main source of flame may not have broken through the barrier, the flash-through provides a source of flame that may ignite materials on the opposite side of the sheet.

The sheet of the invention typically has a weight in the range of 0.04 to 0.06 g/cm$^2$ and a total thickness in the range of 1000 to 1450 microns. Preferably it has a weight in the range of 0.05 to 0.055 g/cm$^2$, a total thickness in the range of 1200 to 1350 microns. However, lighter sheets and thicker or thinner sheets are also useful. Most preferably the sheets of the invention are relatively flexible, i.e., they can be wrapped around small diameter mandrels without cracking or breaking.

Although the sheet of the invention typically has a weight and a thickness in the ranges set forth, lighter sheets and thicker or thinner sheets are also useful.

BRIEF DESCRIPTION OF THE DRAWINGS

The present invention will be further explained with reference to the attached drawings wherein like reference characters refer to the same elements throughout the views and wherein.

DETAILED DESCRIPTION

Figure 1:
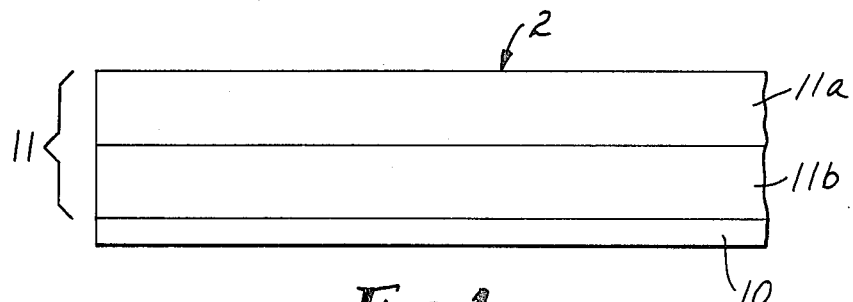
FIG. 1 is a side view of a preferred embodiment of the invention.
Figure 2:
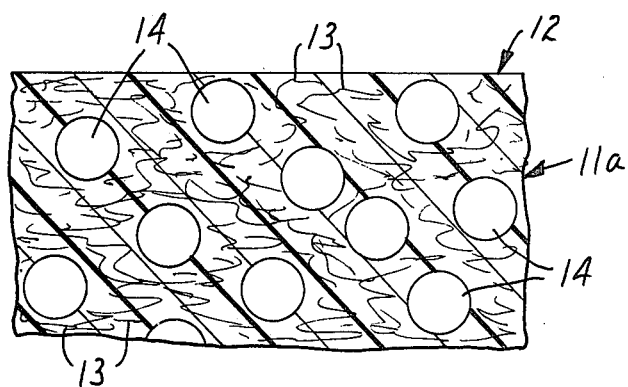
FIG. 2 is a partial cross-sectional view, greatly enlarged, of layer 11a of the embodiment of FIG. 1.

Referring now to FIGS. 1 and 2, the sheet 2 of the present invention comprises a backing 10 bearing a layer 11 that comprises diorganopolysiloxane gum 12, a curing agent (not shown) for the gum, a fibrous filler 13, and hollow glass microspheres 14. Fibrous filler 13 and microspheres 14 are distributed throughout polydiorganosiloxane gum 12.

As shown in the FIG. 1., layer 11 preferably comprises two separate layers 11a and 11b. This embodiment is not essential to the invention, however, as layer 11 may comprise one or more layers.

A wide variety of materials are useful as backing 10. These materials retain their dimensional characteristics when heated. Preferably the backing 10 is a flexible fiberglass cloth. Such cloths are known and are commercially available from, for example, J. P. Stevens Company, Owens-Corning Fiberglas Corporation, and Burlington Glass Fabrics Company.

The backing 10 typically has a weight in the range of 0.01 to 0.02 g/cm$^2$ and preferably one in the range of 0.015 to 0.018 g/cm$^2$. Moreover, backing 10 typically has a thickness in the range of 100 to 230 microns, preferably one in the range of 150 to 180 microns.

Rigid backing materials are also useful in the invention. However, rigid backing materials are not preferred as the resulting sheets are prone to breaking and cracking and, are, therefore, difficult to handle.

Layer 11 comprises a mixture of a cured diorganopolysiloxane gum, a fiber filler, and hollow glass microspheres. When layer 11 is applied to backing 10 it typically has a dried thickness of 900 to 1220 microns, and preferably one in the range of 990 to 1150 microns.

Diorganopolysiloxane gums useful in layer 11 possess good high temperature properties. Examples of useful gums include siloxane polymers, copolymers of siloxane polymers and other polymers, and mixtures thereof. In the siloxane polymers, the repeating units have the structure

wherein $R^1$ and $R^2$ are, individually, organo groups. Representative examples of useful $R^1$ and $R^2$ groups include methyl, ethyl, phenyl, and vinyl. $R^1$ and $R^2$ groups where the hydrogens have been replaced by fluorines, such as 3,3,3-trifluoropropyl, are also useful. Specific examples of useful siloxanes include dimethylpolysiloxane, phenylmethylpolysiloxane, 3,3,3-trifluoropropylmethylpolysiloxane, diphenylpolysiloxane, methylvinylpolysiloxane and phenylvinylpolysiloxane. The terminating units of the siloxane can be, for example, triorganosiloxy units, hydroxyl groups, or alkoxy groups. The triorganosiloxy units can be illustrated by trimethylsiloxy, dimethylvinylsiloxy, methylphenylvinylsiloxy, methyldiphenylsiloxy, 3,3,3-trifluoropropyldimethylsiloxy and the like.

Representative examples of commercially available diorganopolysiloxanes include VL-240 from General Electric Company and S-2351 U from Dow Corning.

The diorganopolysiloxane gum may be cured by mixing from 1 to 5 parts by weight of a curing agent per 100 parts by weight of said gum. Preferably the curing agent comprises about 2 parts by weight per 100 parts by weight of the gum.

A preferred class of curing agents are the organic peroxides such as benzoyl peroxide, bis(2,4-dichlorobenzoyl peroxide), ditertiary butyl peroxide, dicumyl peroxide, paradichlorobenzoyl peroxide, tertiary butyl perbenzoate, and 2,5-bis(tertiary butyl peroxy)-2,5-dimethylhexane.

The fibrous fillers are employed to reinforce the coating and improve its coherence when exposed to flame. The fibers are typically short, i.e., at least 700 microns long, although longer or shorter fibers are also useful. Preferably they are in the range of 3000 to 9000 microns and most preferably about 6000 microns long.

Preferably the fibers are inorganic refractory fibers. Such fibers combine high strength and stiffness with good thermal resistance and low density. Examples of useful inorganic refractory fibers include boron fibers, carbon and graphite fibers, carbon-silica fibers, (i.e., $\alpha$-SiC and $\beta$-SiC), aluminum silicate (i.e., $Al_2(SiO_3)_3$) fibers, aluminum carbide (i.e., $Al_4C_3$) fibers, and potassium silicate (i.e., $K_2SiO_3$) fibers). Other useful fibers include quartz fibers, silica fibers, and glass fibers.

Preferably the fibers are selected from carbon, graphite, and ceramic fibers. Carbon and graphite fibers may be produced by controlled thermal degradation of cellulosic or synthetic fibers, yarns, or textile using techniques known to the art (e.g., rayon and polyacrylonitrile). Graphite fibers are a more crystalline form of carbon fibers.

Examples of carbon fibers useful in the invention include "Fortafil" fibers available from Great Lakes Carbon Corporation, "Celion" and "Celiox" fibers available from the Celanese Corporation, and "Thornel" fibers available from Union Carbide Corporation.

Ceramic fibers are made of the same materials used in the ceramic industry and techniques for their preparation are also known. An example of useful, commercially available ceramic fibers are the "Nextel" fibers available from 3M Company.

The hollow glass microspheres are employed to lower the weight of the coating and to provide a base upon which the diorganopolysiloxane gum can anchor when it chars. The void volume of the microspheres enables them to act as thermal insulators.

The microspheres are typically small, i.e., 10 to 250 microns in diameter, and preferably 20 to 130 microns in diameter. Larger and smaller microspheres may be utilized if desired.

Generally, the glass wall thickness of the microspheres varies from a fraction of a micron up to 10–15% of the diameter of a complete microsphere. Thicker walls (i.e., greater than 15% of the diameter) may also be used, particularly if extremely strong microspheres are desired. The wall thickness of the microspheres is typically in the range of 0.5 to 2 microns.

Glass microspheres and techniques for their preparation are well known. They are commercially available from 3M Company.

A variety of other ingredients (e.g., particulate fillers and flame-retardants) may be incorporated into the coating layer if desired. Typically, particulate fillers can comprise up to 40% by weight of the coating while flame retardants can comprise up to 50% by weight of the coating.

Representative examples of useful particulate fillers include silica aerogel, fumed silica, acetylene black, diatomaceous silica, kaolin, calcium carbonate, silica, zinc oxide, iron oxide, zirconium silicate, and titanium dioxide. Still other particulate fillers are useful as will be understood as a result of this disclosure.

Representative examples of useful flame retardants include mixtures of titanium dioxide and dimethyl silicone oil (e.g., FR-1 from Dow Corning) and aluminum sulfamate.

The sheets of the present invention may be readily prepared. For example, the ingredients of the coating layer may be mixed together with a suitable solvent (e.g., heptane, toluene, mixtures of heptane and toluene) until all of the diorganopolysiloxane gum is dissolved and the micropheres fibers and other ingredients, if any, are uniformly distributed throughout or dissolved in the solution. The solution may then be applied to a desired substrate by any coating technique (e.g., knife coating, roll coating, curtain coating, etc.) at a desired thickness and then dried to remove the solvent. Drying is preferably accomplished by first air drying the sheet at room temperature for 10 to 15 minutes followed by oven drying at about 65° C. for 15 minutes, followed by curing at about 175° C. for 10 minutes. The layer is then post-cured at 350° C. for 3 minutes to remove substantially all of the materials that volatilize below that temperature.

Most preferably, the coating layer is applied in two or more applications, with drying, curing, and post-curing between each, until the desired dry thickness is obtained. The sheet resulting from this multi-application coating technique comprises a backing 10 and a multi-layer coating 11 as is shown by layers 11a and 11b in FIG. 1.

Figure 3:
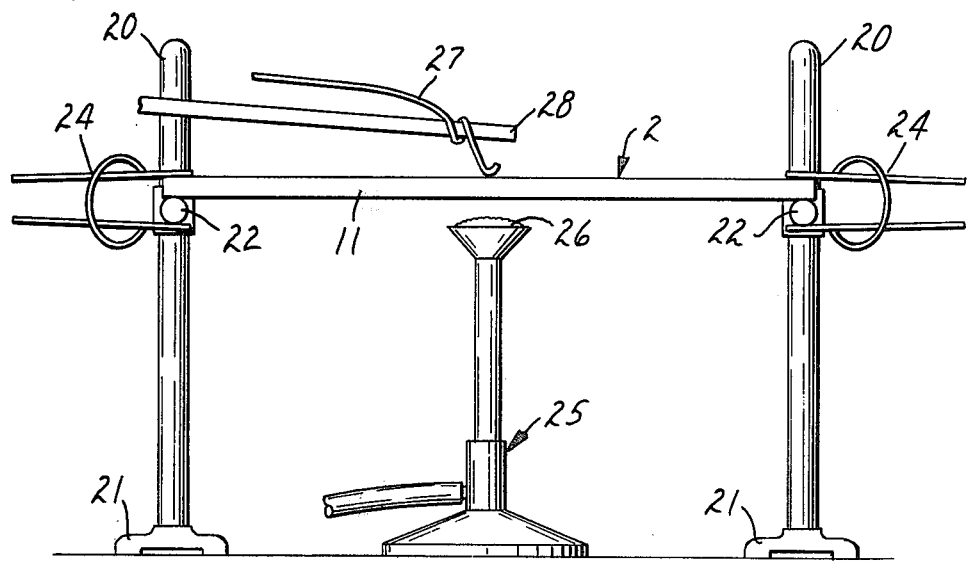
FIG. 3 is a schematic illustration of the apparatus used to test resistance to flame breakthrough.

The present invention is further illustrated by the following examples. In these examples, flame breakthrough was determined according to the following test which utilized the apparatus shown in FIG. 3.

The test apparatus comprised two upright posts 20 that had bases 21 and horizontal bars 22 attached thereto. A sample 2 to be tested was suspended between posts 20 on bars 22 so that it was essentially level with the surface upon which bases 21 rested. Sample 2 was held or fastened to bars 22 by means of clamps 24 with layer 11 (the coating layer) on the bottom. A Bunsen burner 25 was located beneath sample 2 with its face 26 located 2.5 cm below the surface of layer 11, and its flame height and intensity adjusted so that the temperature at said surface was approximately 1370° C. A thermocouple 27, on support 28, was provided on the opposite surface of sample 2 to measure the temperature at said surface. The temperature on said opposite surface at various times was recorded and the sample observed for flame breakthrough.

EXAMPLES 1-4

Coating compositions were prepared from the following ingredients (all amounts are in parts by weight unless otherwise noted):

|  | 1 | 2 | 3 | 4 |
|---|---|---|---|---|
| Diorganopolysiloxane |  |  |  |  |
| VL-240 (a vinyl-containing siloxane from General Electric Company) | 45.2 | 45.2 | — | — |
| S-2351 U (a vinyl-free siloxane from Dow Corning) | — | — | 64.6 | 64.6 |
| Benzoyl Peroxide [(1)] | 3.6 | 3.6 | 5.1 | 5.1 |
| Fibrous Filler |  |  |  |  |
| "Fortafil" (6350 micron long graphite fibers from Great Lakes Carbon Corporation) | 2.9 | — | 2.9 | — |
| Ceramic fiber (6350 micron long ceramic fibers available as "Nextel" fibers from 3M Company) | — | 2.9 | — | 2.9 |
| Hollow Glass Microspheres (B 23/500 glass bubbles from 3M Company) | 32.5 | 32.5 | 32.5 | 32.5 |
| Flame Retardant FR-I (a mixture of TiO$_2$ and silicone oil from Dow Corning) | 19.4 | 19.4 | — | — |

[(1)] Amount of benzoyl peroxide is parts per 100 parts diorganopolysiloxane.

The ingredients were individually combined with toluene to provide a 30.3% solids mixture and then agitated until all of the siloxane had dissolved. The resulting solutions were knife coated through a 890 micron orifice onto a section of fiberglass cloth (No. 7628 available from Burlington Glass Fabrics Company, 178 microns thick, 0.02 g/cm$^2$), air dried at room temperature for 15 minutes, and then dried at 65° C. for 15 minutes. The construction was then cured at 177° C. for 15 minutes and then post cured at 357° C. for 3 minutes. A second 890 microns thick coating was applied to the first, dried, cured and post cured as described above in this example. Post curing removed substantially all components which were volatile below 350° C.

The resulting sheets were 1245 microns thick and had a weight of 0.05 g/cm$^2$. They were tested for flame breakthrough as described above. The temperature (in °C.) at various times (in min) on the side of the fabric away from the flame is listed below.

| Time | Example 1 | 2 | 3 | 4 |
|---|---|---|---|---|
| 0.5 min | 360° C. | 426° C. | 466° C. | 480° C. |
| 1 | 393 | 440 | 478 | 489 |
| 2 | 417 | 497 | 482 | 524 |
| 3 | 440 | 503 | 492 | 529 |
| 4 | 445 | 548* | 501 | 548 |
| 5 | 442 | 553* | 499 | 589 |
| 10 | 438 | 694* | 524 | 593 |
| 15 | 440 | 527 | 527 | 604 |
| 20 | 440 | 522 | 589 | 609 |
| 25 | 433 | 589* | 539 | 635 |
| 30 | 440 | 576* | 548 | 633 |

*Thermocouple penetrated fabric and gave false readings.

No flame break through was observed on any of the samples after 30 minutes even though the coating layer charred.

What is claimed is:

1. A sheet useful as a flame barrier comprising a backing having thereon a coating comprising from 50 to 70% by weight of a cured diorganopolysiloxane gum, from 1 to 10% by weight of a fibrous filler, from 20 to 45% by weight of hollow glass microspheres, and from 1 to 5 parts by weight of a curing agent per 100 parts by weight of said diorganopolysiloxane gum, wherein said sheet is substantially free from components which volatilize below 350° C., and wherein said sheet has a weight of, at most, 0.06 g/cm$^2$.

2. A sheet according to claim 1 wherein said substrate comprises a fiberglass fabric.

3. A sheet according to claim 2 wherein said fibrous filler comprises ceramic fiber.

4. A sheet according to claim 2 wherein said fibrous filler is selected from carbon and graphite fiber.

5. A sheet according to claim 3 or 4 wherein at least one of the organo groups of said diorganopolysiloxane gum is a vinyl group.

6. A flexible sheet according to claim 1.

7. A sheet according to claim 1 wherein said coating further comprises a fire retardant.

8. A sheet according to claim 1 which has a weight in the range of 0.04 to 0.06 g/cm$^2$.

9. A sheet according to claim 1 which has a thickness in the range of 1000 to 1450 microns.

10. A sheet according to claim 1 comprising (i) a flexible fiberglass fabric backing having a thickness of about 180 microns and a weight of about 0.02 g/cm$^2$, and (ii) a coating on at least one side of said fabric backing having a thickness of about 1065 microns thick and a weight of about 0.03 g/cm$^2$; wherein said coating comprises about 65 weight % diorganopolysiloxane gum, about 3 weight % fiber filler, about 32 weight % hollow glass microspheres, and about 3 parts curing agent per 100 parts diorganopolysiloxane gum; and wherein said sheet is substantially free from components which volatilize below 350° C.

11. A sheet according to claim 3 or 4 wherein said diorganopolysiloxane gum is free from vinyl groups.

* * * * *